United States Patent Office 3,595,964
Patented July 27, 1971

3,595,964
METHODS OF TREATING CESTODES WITH DIBUTYL LEAD ESTERS
Georges Gras, Montpellier, France, assignor to International Lead Zinc Research Organization, Inc., New York, N.Y.
No Drawing. Continuation-in-part of application Ser. No. 624,144, Mar. 20, 1967. This application June 5, 1968, Ser. No. 734,517
Claims priority, application Netherlands, Mar. 24, 1966, 6603908
Int. Cl. A61k 27/00
U.S. Cl. 424—293
4 Claims

ABSTRACT OF THE DISCLOSURE

The disclosure of the present application relates to a composition useful as an antihelminticum particularly as an agent useful in combating tape-worms for warm blooded animals, wherein an effective quantity of the dibutyl-lead di-ester of a fatty acid is the active ingredient.

---

This is a continuation-in-part of my copending application Ser. No. 624,144 filed Mar. 20, 1967.

The combating of helminths is a well known problem of long standing, particularly with warm blooded beings. Especially important is the combating of tape-worms. A few of the genera of tape-worms of frequent occurrence are *Anoplocephala spp., Monienzia spp., Taenia spp., Diplyidium caninum, Echinococcus granulosus, Raillietina cesticillus, Choanotaenia spp., Davainea proglottina, Hymenolepis carioca, Hymenolepis fraterna, thysanosoma, avitellina* and *stilesia*.

In practice the problem of helminth infection lies especially with the economically important animals such as chickens, turkeys, goats, sheep and cows, and in particular it lies in the combating of intestinal tape-worms in such animals.

Know products have been suggested and used for this purpose, one of them being Yomesan (registered trademark; 2-hydroxy-5-chloro-N-(2 - chloro-4-nitrophenyl) benzamide). Tin and lead arsenate and di-n-butyltin dilaurate have also been employed for this purpose.

According to the present invention, there is provided an anthelmintic composition containing as active ingredient a dibutyl lead di-ester of a fatty acid having 2–18 carbon atoms, together with a non-toxic liquid or solid diluent or carrier and being in a form suitable for oral administration as hereinafter defined. Such esters are particularly good anthelmintics for warm blooded animals, and especially against tape-worms (cestodes). The present invention also provides a method for the treatment of helminthiasis in warm blooded animals, not being human beings, which comprises administering to such animals an anthelmintically effective oral dose of a dibutyl lead di-ester of a fatty acid having 2 to 18 carbon atoms, together with a nontoxic orally acceptable liquid or solid diluent or carrier. Among the fatty acid esters to be used in this invention, the diacetate is especially preferred but also other fatty acid esters are indicated, such as the dilaurates, the di-mono-chloro acetates, the di-hexylates, the diheptylates and the di-octylates. The term "fatty acid ester" as used herein includes esters which are halogen substituted, as well as unsubstituted fatty acid esters. The choice is, of course, controlled by considerations of the ease of preparation of the active ingredient, that is, the di-fatty acid ester, by requirements as regards the substances with which or in which the active agent is to be combined, and by the important requirement that the compound should have an acceptable low toxicity.

The term "dibutyl lead di-ester" as used in the present specification is intended to cover esters containing all the isomeric butyl radicals, i.e.: normal butyl, iso-butyl, and tert.-butyl.

A comparison of the dibutyl lead diacetate with the well known product Yomesan, shows that the agent according to this invention has an effect as an anthelmintic which is 50 times as strong under otherwise equal conditions.

The di-butyl lead di-esters have a much more favorable anthelmintic effect than other known agents such as dibutyltin dilaurate, lead and tin arsenate, Yomesan, phenothiazine, nicotine sulphate and the piperazines. It is observed, however, that according to the present invention agents of the types just described known in the prior art may occasionally be incorporated in the preparation in order to broaden the effective spectrum.

The phrase "in a form suitable for oral administration" as used in the present specification means that the anthelmintic composition is made up either as discrete coherent portions such as tablets, capsules, or dragees, or as a powder, or as a liquid or solid concentrate which may be suitable either for direct oral administration or for admixture with food or drink.

In making a composition of the anthelmintic agent of the invention, particularly of an agent to be used against tape-worms in warm blooded animals, an anthelmintically effective quantity of the di-butyl lead di-ester, such as the diacetate, is incorporated with other medicinal agents or diluents or carrier media to form a preparation for oral administration. Such media per se are well known.

The preferred dose is, of course, one which leaves the intestines of the treated animals without living tape-worms, and is preferably between 5 and 15 mg./kg. body weight. The dosage is generally expressed in milligrams per kilogram of body weight.

With mice, chickens and sheep the most preferred dose appears to be in the order of magnitude of 5 mg./kg. Accordingly, if a 60 kg. sheep gets a single encapsulated dose of 300 mg. of dibutyl lead diacetate, it is freed from tape-worms. Even if much less is administered, for example 1 mg./kg., some tape-worms will still be killed but perhaps not all of them.

If the weight of the subject is about 100–120 kilograms, a single dose of about 600 mg. is of the right order of magnitude. In fact, a dosage may range from 400 to 800 milligrams, but 100 mg. is probably too little for a single dose for such an individual.

In drinking water, for instance for chickens, the adequate dose per chicken (2 kg.) will be about 10–20 mg. of dibutyl lead diacetate. A calculated amount of the anthelmintic agent is taken up into some water together with some bentonite and sodium carboxymethyl-cellulose, which concentrate is subsequently admixed with the drinking water. For admixture with drinking water, it is also possible to make a concentrate containing dibutyl lead diacetate, a generous quantity of sucrose and some sodium lauryl-sulphate. After having been ground, the concentrate is added to the drinking water in appropriate quantities.

The effective dose of the anthelmintic agent may be determined by experiments on mice. One such experiment is described in the following Example 1.

EXAMPLE 1

18 mice, which according to an examination of their faeces were free from tape-worms, were infected with tape-worm eggs of the species *Hymenolepis fraterna*. After a period of about 15 to 20 days, tape-worm eggs were found in the faeces. A single dose of an anthelmintic composition of the invention taken up in water containing Tween 80 (registered trademark, polyoxyethylene sorbitan monooleate) was then administered orally to eight of the mice by means of a gullet probe. The remaining ten mice remained untreated and served as a control. After four days all the animals were sacrificed and the intestines examined for tape-worms.

The effective dose was taken as that which leaves the intestines of the treated animals free of living tapeworms.

Many such experiments were carried out with mice after they had been infected artificially with *Hymenolepis fraterna*. The effective dose (100% of tape-worms killed) was found to be of the order of magnitude of 5 mg./kg. The weight of a mouse is about 20 grams and thus the effective dose in this instance is about 0.1 mg.

When conclusions have been drawn from the experiments on mice, the effective dosages for larger animals may be forecast. Thus, for sheep, cows, chickens and other warm blooded creatures, the effective dose may be determined on a weight for weight basis. With chickens, which on this occasion had been infected artificially, i.e. with *Haillietina cesticillus*, there was also found to be an active dose (100% of tape-worms killed) of about 5 to 10 mg./kg. The same results were found in the case of sheep. One should, however, always be prepared for a certain degree of variation from the value predicted from the measurements made on mice when one attempts to forecast the effective dosage for other species of animals. These questions and the manner of dealing with them are well known to the expert and may be easily taken into account by him.

Once the effective dose in milligrams per kilogram live body weight for a certain species of animals has been established, only the weight of the animal is of importance in determining the single oral dose to be administered. Sheep weigh up to from 80 to 90 kilograms; weanling lambs from 30 to 40 kg.; chickens about 2 kg. If, especially with chickens, it is desired to administer the agent by means of the drinking water or the solid food, it is to be remembered that the chicken will take 200 grams of water and 100 grams of other food per day on the average. The desired dosage therefore can be calculated on the basis of these water and food intakes.

Because of the spread which occurs in the weight of the animals, it is usual to ensure complete destruction of the parasites and therefore the single dose is based on the highest weight occurring under ordinary conditions, and the minimum dose per kilogram required according to the animal experiments. In selecting the dosage, the toxicity expressed as the acute mean lethal dose, $LD_{50}$, discussed below is also to be considered. That is, the method can only be employed with safety if the effective dose lies far below the toxic dose.

The toxicity, expressed as $LD_{50}$, is the dose at which ½ of the treated experimental animals die as a result of the medicine administered. It is necessary for the effective dose to be much smaller than the $LD_{50}$. It is, however, also desirable that the effective dose should be small. For all warm blooded animals, the oral $LD_{50}$ of the anthelmintic agent of the present invention, for example, the dibutyl lead diacetate, generally lies above about 150 mg./kg. It is therefore quite safe to administer an effective dose of 10–15 mg./kg. in order to be absolutely certain that the helminths are removed, for even so the dose will be only a fraction of the $LD_{50}$.

In practice only one form of administering is of importance, i.e., the oral form. The effective preparation, taken up, for instance, in water, may be admixed with the food. This way of administering is sometimes chosen with chickens. However, in the vast majority of cases, including chickens, the oral dose is administered in the form of a capsule or a tablet. With sheep for instance, this is the only practical method in summer, when they do not get extra food into which the effective agent could be introduced. In addition to this, mixing with food or drinking water has the drawback that it cannot be accurately established how much the animal has taken, and in such cases another dose of the effective agent should be administered in the food the next day. But in the vast majority of cases recourse is had to oral administration in the form of a shaped article such as a tablet, a dragee or a capsule. In theory, oral administration of the effective agent by itself is possible. In practice, however, this is impractical, because in that case there is no certainty about the dosage actually taken. A sheep, for instance, will not by any means submit meekly to the oral administration of powders. In these cases the capsule is eminently suitable. It is inserted into the mouth of the animal to be treated and, provided it is not too big there will be no difficulties. The following Examples 2 to 5 illustrate the invention, but do not in any way limit the same.

EXAMPLE 2

Lecithin was dissolved in maize oil, a small quantity of Tween 80 (emulsifier) added, and a measured quantity of dibutyl lead diacetate was added with vigorous stirring.

The liquid composition thus obtained was dispensed in gelatin capsules in known manner, the capsules each containing 300 mg. of dibutyl lead diacetate. These capsules were then administered orally singly to sheep weighing about 60 kg.

EXAMPLE 3

A food additive was prepared by mixing a measured quantity of di-normal butyl lead diacetate with a minor proportion of calcium phosphate and a major proportion of calcium carbonate, and grinding the mixture.

| Material: | Grams |
|---|---|
| Maize flour (or corn-meal) | 29.20 |
| Barley-meal (de-shelled) | 20.00 |
| Oats flour (shelled) | 20.00 |
| Soybean meal | 8.00 |
| Sesame meal | 4.00 |
| Bran of crushed wheat | 5.00 |
| Norway meal of herrings | 9.00 |
| Powder of whey | 2.50 |
| Minerals | 1.50 |
| Vitamin $AD_3$ commercial product | 0.25 |
| Vitamin B commercial product | 0.50 |
| | 99.95 |

To this food di-normal butyl diacetate is added (50–150 parts per million).

The additive was mixed with chicken feed, in such an amount that 100 gm. of feed contains about 10 mg. of dibutyl lead diacetate, this quantity constituting a daily dose, and the feed administered to chickens weighing about 2 kg. each.

EXAMPLE 4

Dibutyl lead diacetate was taken up into water with bentonite and sodium carboxymethyl cellulose, and thoroughly mixed to form a concentrate.

The concentrate was diluted with water, and administered to chickens weighing about 2 kg. each as drinkwater such that 200 gm. of water contained about 10–20 mg. of dibutyl lead diacetate, this being the average daily intake per bird.

EXAMPLE 5

A concentrate was prepared by mixing dibutyl lead diacetate, a major proportion of sucrose, and a minor proportion of sodium lauryl sulphate, and grinding the mixture.

The concentrate was added to the drinking water of chickens weighing about 2 kg. each in such amounts that 200 gm. drinking water contained about 10–20 mg. of dibutyl lead diacetate.

EXAMPLE 6

Tablet

| | G. |
|---|---|
| Finely powdered dibutyl lead diacetate | 500 |
| Lactose | 125 |
| Starch | 100 |
| Magnesium stearate | 3 |
| | 728 |

Method

Mix the ingredients withholding half of the magnesium stearate. Compress into slugs. Grind into 14–16 mesh granules using a Manesty granulator. Mix in the rest of the magnesium stearate. Compress to a cutting weight of 0.728 g. Each tablet contains 0.500 g. dibutyl lead diacetate. The tablets can be coated with sugar or any other coating material.

EXAMPLE 7

Soft gelatine capsule for administration to sheep.

| | G. |
|---|---|
| Finely powdered dibutyl lead diacetate | 600 |
| Tween 80 [1] | 60 |
| Soybean lecithin | 60 |
| Maize oil (or a sufficient quantity) | 1280 |
| | 2000 |

[1] Trademark Atlas Chemical Co.

Method

Mill the dibutyl lead diacetate with enough of the oil to produce a thick paste using a triple roller ointment mill. Add the rest of the maize oil and mix thoroughly. Feed the mixture by meter pump between two sheets of plasticized gelatine film into the nip between rollers having intermeshing capsule shaped cavities cut in their surfaces. The resulting soft gelatine capsules are dried, washed in a suitable solvent and dried again.

The amount of maize oil is adjusted so that each capsule contains 0.300 g. (1 grain) dibutyl lead diacetate.

EXAMPLE 8

Preparation for chickens:

| | G. |
|---|---|
| Finely powdered dibutyl lead diacetate | 10 |
| Bentonite magma U.S.P. to 1000 ml. | |

Method

Mix the dibutyl lead diacetate with the bentonite magma and fill into a wide mouthed bottle. The contents of the bottle are mixed with the sole water supply for 1000 chickens making sure that whole of the water is used up within a single day.

With chickens the dibutyllead diacetate is able to kill with an efficiency of 96–100%, the adult forms of *Choanotaenia infundibulum*, *Raillietina tetragona*, *Raillietina echinobothrida*, *Cotugnia digonopora* and *Hymenolepis carioca* (with 5–10 milligram/kg.).

The compound also shows remarkable action against immature forms of *Choanotaenia infundibulum* and *Raillietina tetragona* (efficiency from 88–97%) and on those of *Raillietina cesticillus* and *Hymenolepis carioca* (up to 100% efficiency for 10 milligram/kg.).

It should be borne in mind that the compositions of the invention, when taken in large quantities, are toxic and by themselves should be handled with care.

Tablets may be made, for example, from dibutyl lead diacetate, a little talcum powder, some magnesium stearate and the remaining part starch. Both in this as in other forms of administration, it is understood that known substances may be introduced into the tablets, capsules, liquids, powders and the like as an addition, such as other medicaments, surfactants, edible powders, vitamins, minerals, antibiotics and growth promoting agents.

The compositions of the invention may also comprise besides the active esters, other substances such as other medicaments, surfactants, vitamins, minerals, antibiotics and growth-promoting agents, which are familiar to those skilled in the art.

What I claim is:

1. A method for the treatment of cestodes in warm blooded animals which comprises orally administering to such animals a non-toxic but cestocidal amount of a dibutyl lead di-ester of a fatty acid having 2 to 18 carbon atoms, together with a non-toxic orally acceptable liquid or solid diluent or carrier.

2. A method according to claim 1 wherein the oral dose is in the form of at least one tablet or capsule.

3. A method according to claim 1 wherein the oral dose contains from 5 to 15 mg. per kg. body weight of the dibutyl lead di-ester.

4. A method according to claim 1 wherein the dibutyl lead di-ester is dibutyl lead diacetate.

References Cited

UNITED STATES PATENTS

| 2,702,778 | 2/1955 | Kerr et al. |
| 3,142,614 | 7/1964 | Ligett. |
| 3,344,019 | 9/1967 | Sowa. |

OTHER REFERENCES

Pieper et al., J. of Economic Entomology, vol. 58, June 1965.

Gras—Rev. D'Elevage et de Med. Veter., vol. XIX, No. 1, 1966, pp. 15, 16, 17, 18, 19 and 20.

SAM ROSEN, Primary Examiner